(12) United States Patent
Liu

(10) Patent No.: US 12,017,856 B2
(45) Date of Patent: Jun. 25, 2024

(54) PICKING AND DISPATCHING SYSTEM AND METHOD

(71) Applicant: BEIJING GEEKPLUS TECHNOLOGY CO., LTD., Beijing (CN)

(72) Inventor: Kai Liu, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 29 days.

(21) Appl. No.: 18/146,623

(22) Filed: Dec. 27, 2022

(65) Prior Publication Data
US 2023/0139043 A1  May 4, 2023

Related U.S. Application Data

(63) Continuation of application No. PCT/CN2021/095277, filed on May 21, 2021.

(30) Foreign Application Priority Data

Jul. 8, 2020  (CN) .......................... 202010652845.4

(51) Int. Cl.
*B65G 1/137* (2006.01)
(52) U.S. Cl.
CPC .................. *B65G 1/1375* (2013.01)
(58) Field of Classification Search
CPC ................................... B65G 1/1375
See application file for complete search history.

(56) References Cited

U.S. PATENT DOCUMENTS

| 10,384,869 B1 | 8/2019 | Shiee et al. | |
|---|---|---|---|
| 2014/0351101 A1* | 11/2014 | Danelski | G06Q 30/06 705/28 |

(Continued)

FOREIGN PATENT DOCUMENTS

| CN | 105129308 | 12/2015 |
|---|---|---|
| CN | 105469201 | 4/2016 |

(Continued)

OTHER PUBLICATIONS

WIPO, International Search Report for PCT/CN2021/095277, Aug. 20, 2021.

(Continued)

*Primary Examiner* — Kyle O Logan
(74) *Attorney, Agent, or Firm* — Hodgson Russ LLP

(57) ABSTRACT

A picking and dispatching system includes: a control center, terminals carried by users, and handling devices. The control center is configured to: determine an item storage space of a to-be-picked item included in each of to-be-picked orders, and plan paths for each user and each handling device to reach the item storage space; match, according to each planned path and assigned to-be-picked order, a user and a handling device for picking, to determine to-be-selected tasks, and determine a moment at which a user and a handling device cooperate to pick from the item storage space; determine a target task from the to-be-selected tasks, and send the target task to a terminal and a handling device; assign, according to the target task sent to the handling device, a to-be-picked order to the handling device, and update the stored assignment result of the to-be-picked orders.

19 Claims, 8 Drawing Sheets

(56) References Cited

U.S. PATENT DOCUMENTS

| | | | | |
|---|---|---|---|---|
| 2018/0043533 A1* | 2/2018 | Johnson | ................ | B25J 9/1666 |
| 2018/0127211 A1* | 5/2018 | Jarvis | ................... | B65G 1/1373 |
| 2018/0365631 A1* | 12/2018 | Moulin | ................... | G08G 1/20 |
| 2019/0077599 A1* | 3/2019 | Witt | ........................ | G06F 1/163 |
| 2019/0378152 A1 | 12/2019 | Zhang et al. | | |
| 2020/0031578 A1* | 1/2020 | Lisso | ................... | B65G 1/1375 |
| 2020/0223635 A1* | 7/2020 | Govindaswamy | ... | B65G 1/1375 |
| 2020/0316786 A1* | 10/2020 | Galluzzo | ................. | B25J 9/162 |
| 2020/0387154 A1* | 12/2020 | Sellner | ................ | G05D 1/0027 |

FOREIGN PATENT DOCUMENTS

| | | |
|---|---|---|
| CN | 106569488 | 4/2017 |
| CN | 107992977 | 5/2018 |
| CN | 109399123 | 3/2019 |
| CN | 110598908 | 12/2019 |
| CN | 111824657 | 10/2020 |
| JP | 2020040762 A | 3/2020 |
| JP | 2022523083 A | 4/2022 |
| JP | 2022533784 A | 7/2022 |

OTHER PUBLICATIONS

CNIPA, First Office Action for CN Application No. 202010652845. 4, Jun. 30, 2021.

JPO, Decision to Grant a Patent for JP Application No. 2022-579118, Dec. 19, 2023.

\* cited by examiner

PICKING AND DISPATCHING SYSTEM AND METHOD

CROSS-REFERENCE TO RELATED APPLICATIONS

The present disclosure is a continuation of International Patent Application No. PCT/CN2021/095277 filed on May 21, 2021, which claims the priority to Chinese Patent Application No. 202010652845.4, filed on Jul. 8, 2020, the entire disclosures of which are incorporated herein by reference.

TECHNICAL FIELD

The present disclosure relates to the field of warehousing and logistics technologies, and in particular, to a picking and dispatching system, method, and apparatus.

BACKGROUND

At present, with the rapid development of the logistics industry, how to improve the picking efficiency of items in a warehouse to shorten the time from order to delivery is an important problem to be solved urgently in the warehousing and logistics industry.

In the conventional method of manual picking, the staff is required to find, according to items in a to-be-picked order, item storage spaces of the items sequentially for picking. The optimization space for the staff picking path is small. As a result, the staff wastes a lot of time moving between item storage spaces during manual picking.

In the related art, to reduce the time wasted by personnel movement, a smart warehouse solution is usually adopted. Handling devices are added in the warehouse to assist manual picking, to improve the item picking efficiency in the warehouse. There are two common smart warehouse solutions. In one solution, a handling device (for example, a robot) moves and picks items on special shelves with rails, the handling device transports the picked items to a picking area, and the staff or other devices perform subsequent processes. In another solution, a handling device (for example, an automated guided vehicle, AGV) transports shelves to the picking area, and the staff or other devices perform subsequent processes.

However, the foregoing two solutions both require reconstruction of the warehouse shelves to meet the operating requirements of the handling machines, leading to high costs of cooperative picking between handling devices and the personnel for the conventional warehouse. As a result, the conventional warehouses usually have to continue to adopt the conventional method of picking items manually.

SUMMARY

In a first aspect of embodiments of the present disclosure, a picking and dispatching system is provided, including: a control center, a plurality of terminals each carried by a user, and a plurality of handling devices. The control center is configured to determine an item storage space of a to-be-picked item included in each of to-be-picked orders, and plan, for the item storage space, paths for each user and each handling device to reach the item storage space according to a start location of each terminal and a start location of each handling device, respectively. The control center is configured to determine, according to a stored assignment result of the to-be-picked orders, a to-be-picked order that has been assigned to a handling device. The control center is configured to match, according to each planned path and the to-be-picked order that has been assigned, a user and a handling device for picking from the item storage space, to determine a plurality of to-be-selected tasks, and determine a moment at which a user and a handling device involved in each to-be-selected task cooperate to pick from the item storage space. The control center is configured to determine a target task from the plurality of to-be-selected tasks according to a determined picking moment sequence of the plurality of to-be-selected tasks, and send the target task to a terminal carried by a user that performs the target task and a handling device that performs the target task. The control center is configured to assign, according to the target task sent to the handling device, a to-be-picked order including a to-be-picked item of the target task to the handling device, and update the stored assignment result of the to-be-picked orders. Each terminal is configured to monitor its own location, send the location to the control center, receive the target task sent by the control center, and prompt the user to perform the target task. Each handling device is configured to monitor its own location, send the location to the control center, and travel to an item storage space for picking according to the received target task.

In a second aspect of embodiments of the present disclosure, a picking and dispatching method is provided, including: determining an item storage space of a to-be-picked item included in each of to-be-picked orders; planning, for the item storage space, paths for each user and each handling device to reach the item storage space according to a start location of each terminal and a start location of each handling device, respectively; determining, according to a stored assignment result of the to-be-picked orders, a to-be-picked order that has been assigned to a handling device; matching, according to each planned path and the to-be-picked order that has been assigned, a user and a handling device for picking from the item storage space, to determine a plurality of to-be-selected tasks, and determining a moment at which a user and a handling device involved in each to-be-selected task cooperate to pick from the item storage space; and determining a target task from the plurality of to-be-selected tasks according to a determined picking moment sequence of the plurality of to-be-selected tasks, and sending the target task to a terminal carried by a user that performs the target task and a handling device that performs the target task, to allow the user and the handling device to perform the target task, assigning a to-be-picked order including a to-be-picked item of the target task to the handling device, and updating the stored assignment result of the to-be-picked orders.

In a third aspect of embodiments of the present disclosure, a non-transitory computer-readable storage medium is provided. The non-transitory computer-readable storage medium has stored therein executable instructions that, when loaded and executed by a processor, causes the processor to implement the picking and dispatching method as described in the second aspect.

DETAILED DESCRIPTION

To clearly state the objectives, technical solutions, and advantages of the present disclosure, the technical solutions of this application are clearly and completely described below with reference to specific embodiments of the present disclosure and corresponding accompanying drawings. The described embodiments are only some embodiments rather than all the embodiments of this application. All other embodiments obtained by a person of ordinary skill in the art based on the embodiments of the present disclosure without creative efforts shall fall within the protection scope of this application.

Figure 1:
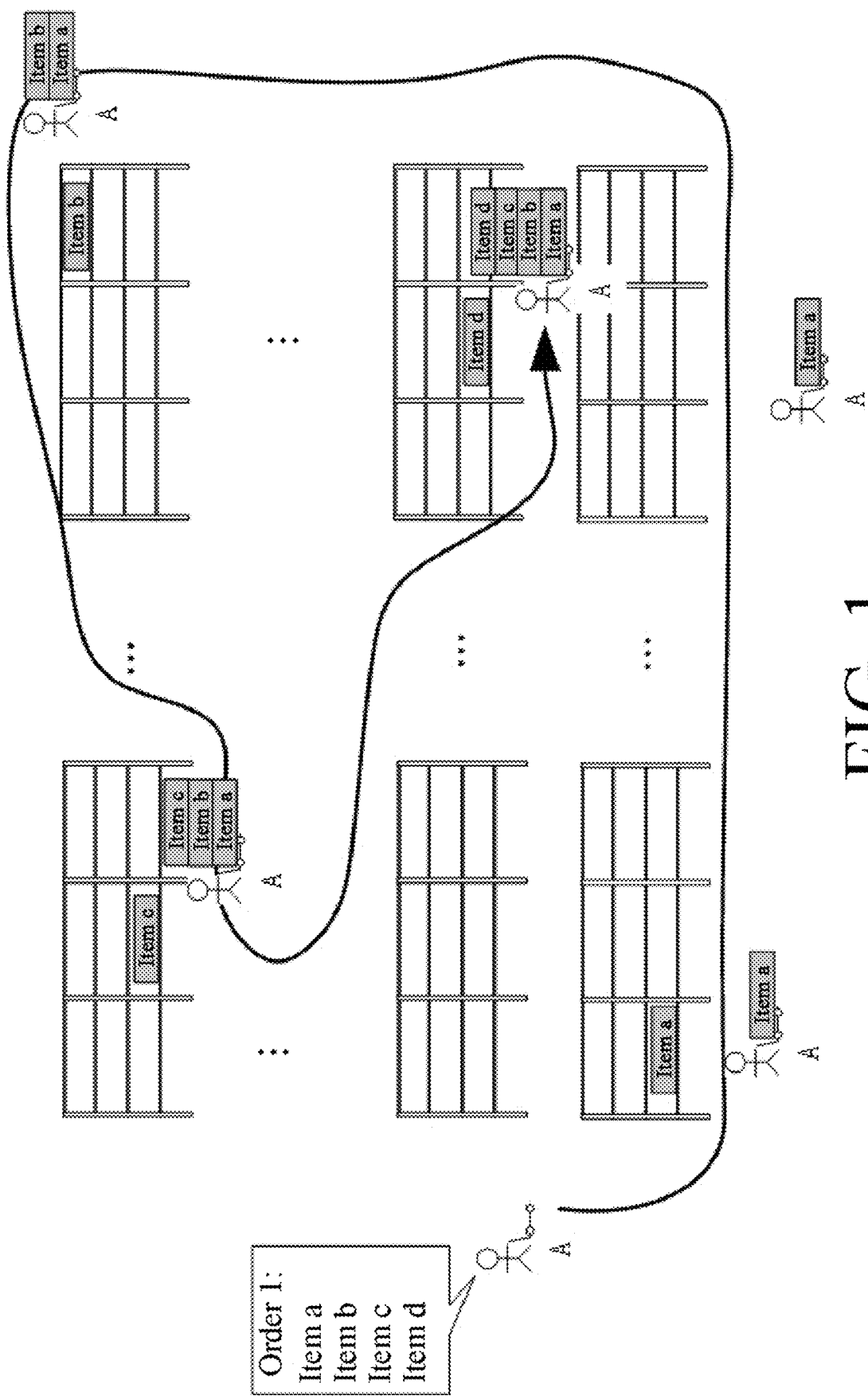
FIG. 1 is a schematic structural diagram of an existing conventional warehouse.

The structure of the existing conventional warehouse is shown in FIG. 1, where a user is specifically a picker of the warehouse, who usually carries a cart or a truck, and according to to-be-picked items included in a dispatched to-be-picked order, sequentially moves to corresponding item storage spaces in the warehouse for picking. Generally, the picking path is not optimized, which causes the user to spend a long time moving between item storage spaces. Even if the picking path is optimized, since one to-be-picked order is only handled by one user, in a case where the to-be-picked items included in the to-be-picked order are stored in a distributed manner in the warehouse, the user also needs to walk a long distance to sequentially pick the items. As shown in FIG. 1, four to-be-picked items included in an order 1 (assigned to user A) are located in four corners of the warehouse. In this case, the user A needs to sequentially move to the four corners to complete the picking.

In addition, there are existing methods in which handling devices and users coordinate in picking, which only replace the cart or truck moved by the user with a handling device that can automatically move, and still requires the user to follow the handling device to sequentially reach item storage spaces of the to-be-picked items included in the to-be-picked order for picking. In fact, only the physical consumption of the user in moving the cart or truck is reduced, and the picking efficiency is not improved.

Figure 2:
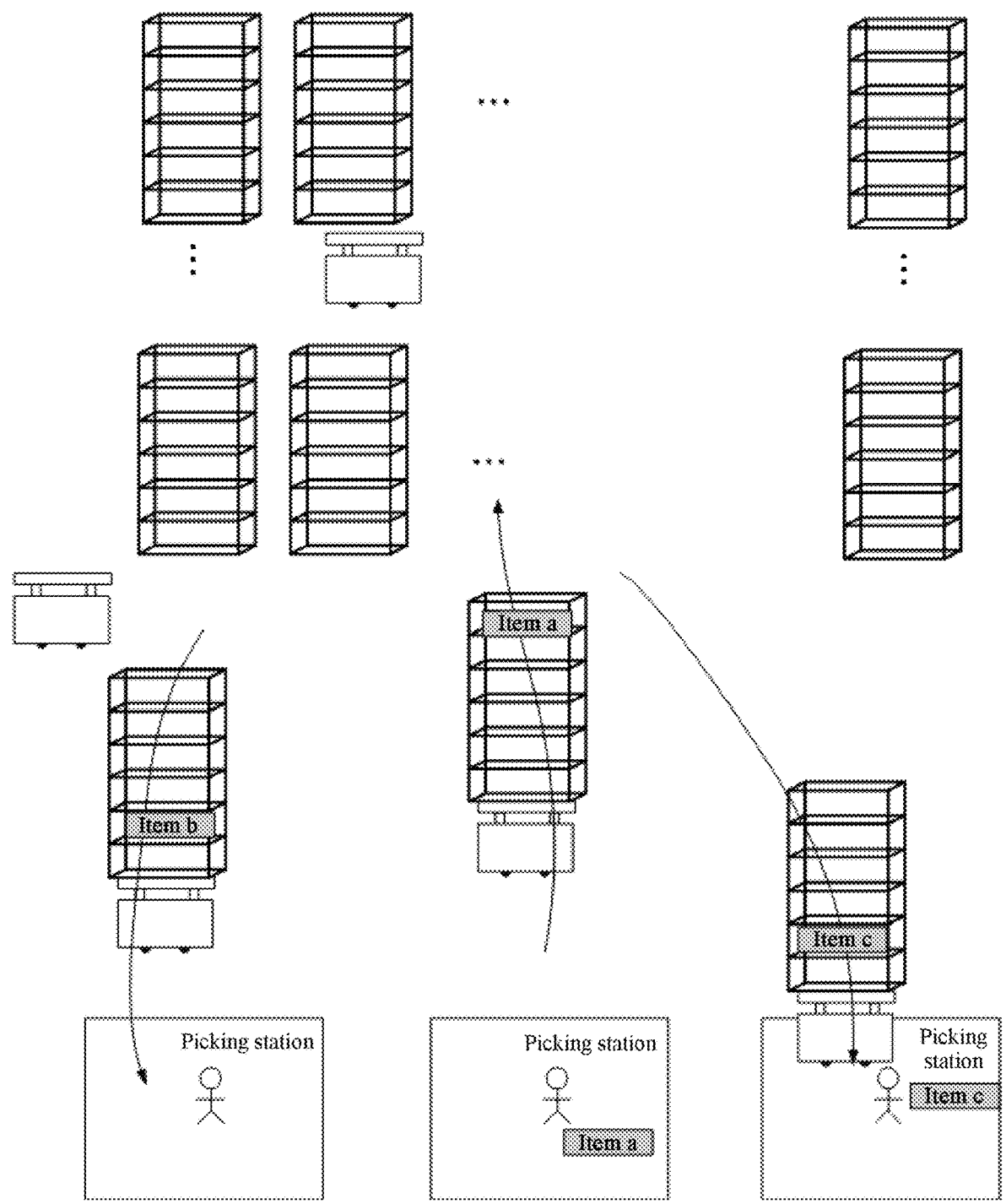
FIG. 2 is a schematic structural diagram of a plurality of existing smart warehouses.

The existing common smart warehouse is shown in FIG. 2. According to a shelf where a to-be-picked item is located, a handling device transports the shelf to a picking area, and a user in the picking area picks the item from the shelf to achieve fast picking. However, the shelf of such a smart warehouse is not the shelf of the conventional warehouse, and the warehouse needs to be greatly upgraded and transformed, leading to high costs.

The embodiments of the present disclosure provide a picking and dispatching system, method, and apparatus, to solve the problem of low picking efficiency in the related art to at least some extent due to the requirement for the personnel to move in a large range during manual picking of items.

In the present disclosure, a picking and dispatching system is provided, including: a control center, a plurality of terminals each carried by a user, and a plurality of handling devices. The control center is configured to determine an item storage space of a to-be-picked item included in each of to-be-picked orders, and plan, for the item storage space, paths for each user and each handling device to reach the item storage space according to a start location of each terminal and a start location of each handling device, respectively. The control center is configured to determine, according to a stored assignment result of the to-be-picked orders, a to-be-picked order that has been assigned to a handling device. The control center is configured to match, according to each planned path and the to-be-picked order that has been assigned, a user and a handling device for picking from the item storage space, to determine a plurality of to-be-selected tasks, and determine a moment at which a user and a handling device involved in each to-be-selected task cooperate to pick from the item storage space. The control center is configured to determine a target task from the plurality of to-be-selected tasks according to a determined picking moment sequence of the plurality of to-be-selected tasks, and send the target task to a terminal carried by a user that performs the target task and a handling device that performs the target task. The control center is configured to assign, according to the target task sent to the handling device, a to-be-picked order including a to-be-picked item of the target task to the handling device, and update the stored assignment result of the to-be-picked orders. Each terminal is configured to monitor its own location, send the location to the control center, receive the target task sent by the control center, and prompt the user to perform the target task. Each handling device is configured to monitor its own location, send the location to the control center, and travel to an item storage space for picking according to the received target task.

In some embodiments, the control center is configured to: determine, for an item storage space, a to-be-picked order including a to-be-picked item to be picked from the item storage space; match, when the to-be-picked order is assigned to a handling device, a user and the handling device for picking from the item storage space according to a path for the handling device to reach the item storage space and a path for each user to reach the item storage space to determine the plurality of to-be-selected tasks; and match, when the to-be-picked order is not assigned to any handling device, a user and a handling device for picking from the item storage space according to planned paths for each handing device and each terminal to determine the plurality of to-be-selected tasks.

In some embodiments, after sending the target task to a terminal carried by a user that performs the target task and a handling device that performs the target task, the control center is configured to store start locations of the terminal and the handling device according to a location of the item storage space of the target task.

In some embodiments, the control center is configured to obtain, for each terminal, a current location of the terminal as a start location of the terminal when the terminal has no to-be-performed target task, and obtain a stored start location of the terminal when the terminal has a to-be-performed target task; and obtain, for each handling device, a current location of the handling device as a start location of the handling device when the handling device has no to-be-performed target task, and obtain a stored start location of the handling device when the handling device has a to-be-performed target task.

In some embodiments, the control center is configured to determine, for each to-be-selected task according to paths corresponding to a user and a handling device included in the to-be-selected task, a user travel time and a handling device travel time; determine a user arrival moment according to the user travel time and a moment at which the user departs from the start location of the terminal; determine a handling device arrival moment according to the handling device travel time and a moment at which the handling device departs from the start location; and determine, according to the user arrival moment and the handling device arrival moment, a moment at which the user and the handling device cooperate to pick from the item storage space.

In some embodiments, the control center is configured to determine, for each terminal, a current moment as a moment at which a user departs from a start location of the terminal when the terminal has no to-be-performed target task, and determine, when the terminal has a to-be-performed target task, a moment at which the to-be-performed target task of the terminal is completed as the moment at which the user departs from the start location of the terminal; and determine, for each handling device, a current moment as a moment at which the handling device departs from a start location when the handling device has no to-be-performed target task, and determine, when the handling device has a to-be-performed target task, a moment at which the to-be-performed target task of the handling device is completed as the moment at which the handling device departs from the start location.

In some embodiments, the control center is configured to determine, for each handling device, remaining storage space of the handling device according to a to-be-picked order assigned to the handling device; and skip assigning, when the remaining storage space of the handling device is less than storage space required by an unassigned to-be-picked order, a target task corresponding to the unassigned to-be-picked order to the handling device.

In some embodiments, when reaching the item storage space, the terminal or the handling device determines that the picking is completed according to a monitored user operation, and sends information that the target task is completed to the control center; and the control center is configured to update the to-be-picked items according to the received information that the target task is completed.

In some embodiments, the system further includes: a positioning base station, where the positioning base station is configured to communicate with each terminal, determine a location of each terminal, and send the determined location of each terminal to the control center.

In some embodiments, each handling device is configured to determine its own location according to acquired environment information, and send the location to the control center.

The following describes the technical solution provided in each embodiment of this application in detail with reference to the accompanying drawings.

Figure 3:
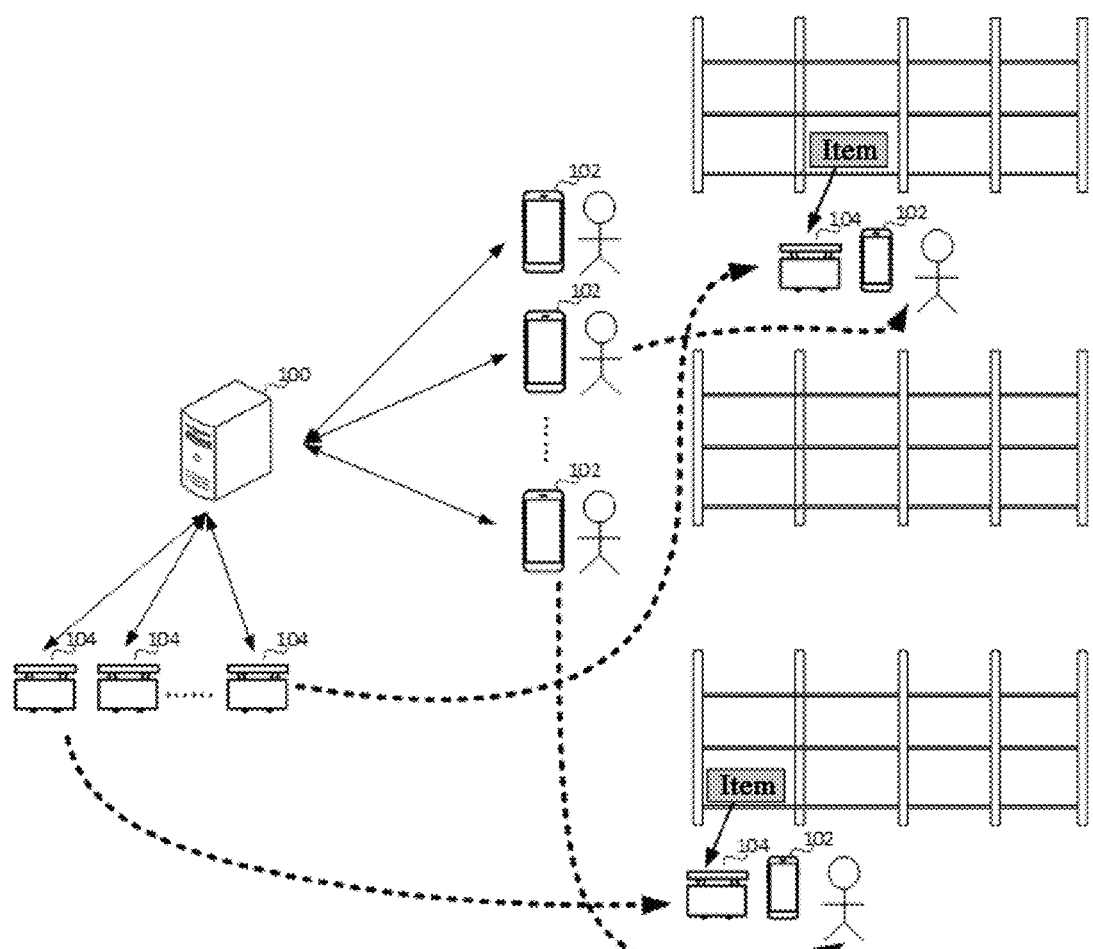
FIG. 3 is a schematic diagram of a picking and dispatching system according to an embodiment of the present disclosure.

FIG. 3 is a schematic diagram of a picking and dispatching system according to an embodiment of the present disclosure. The system includes: a control center 100, terminals 102 carried by users, and handling devices 104.

The control center 100 is configured to remotely control a handling device 104 to reach an item storage space (different handing devices may reach different places), and send a target task to a terminal 102 to prompt a user carrying the terminal to reach the item storage space to cooperate with the handling device 104 in picking, to complete the item picking (that is, the target task described in the present disclosure). Specifically, the control center 100 may be a device for picking and dispatching in the warehouse, for example, a server, and may be a single device or a distributed server formed by a plurality of devices, which is not limited in the present disclosure. In the present disclosure, picking refers to a process of picking out an item listed in an order from an item storage space of a warehouse according to requirements of the order. A to-be-picked order refers to an order that includes an item that has not been picked, and a to-be-picked item refers to an item included in the to-be-picked order that has not been picked.

The terminal 102 is a terminal carried by a user, and specifically may be a mobile phone, a tablet computer or other devices, which is not limited in the present disclosure. The terminal 102 is configured to monitor its own location, send the location to the control center 100, receive the target task sent by the control center 100, and prompt the user to perform the target task. The user is a picker in the warehouse, who reaches, according to the target task to be performed that is prompted by the terminal 102, the item storage space and cooperate with the handling device 104 in the warehouse in picking. During picking, the user can determine a to-be-picked item, a quantity of the to-be-picked item, an item storage space of the to-be-picked item and the like through the terminal 102 according to the information included in the target task, and pick the corresponding to-be-picked item from the item storage space and place the items on the handling device 104 to complete the target task.

The handling device 104 is a device in the warehouse that cooperates with the user in picking, and as described above, the handling device 104 places the to-be-picked item picked by the user. Therefore, the handling device 104 may be provided with an area for placing the picked item. For example, the handling device 104 is provided with a plurality of buffer boxes, or the handling device 104 is provided with storage compartments for storing items picked by the user. The present disclosure does not limit how the handling device 104 stores items.

The handling device 104 is configured to monitor its own location, send the monitored location information to the control center 100, and travel to the item storage space according to the received target task sent by the control center 100. The user picks the to-be-picked item from the item storage space and place the item on the handling device 104 to complete the received target task.

In addition, both the handling device 104 and the terminal 102 can use the existing relatively mature positioning technology to determine their own locations. The specific method and the positioning manner may be set as required, which are not limited in the present disclosure.

As can be seen in FIG. 3, the control center 100 sends the target task to the handling devices 104 and the terminals 102. The handling devices 104 receiving the target tasks reach the item storage spaces along dotted lines as shown, and cooperate with users who reach the item storage spaces along dotted lines according to the target tasks prompted by the terminals 102 to pick the items from the item storage spaces.

For ease of understanding, the present disclosure takes a process of determining a target task by the control center 100 and sending the task to a handling device 104 and a terminal 102 as an example for description:

In the present disclosure, the control center 100 may consider, for each to-be-picked order, each to-be-picked item included in the to-be-picked order as an independent picking task, determine a plurality of to-be-selected tasks by planning paths for each handling device 104 and each user to travel for picking, and determine, by determining picking efficiency of each to-be-selected task, a target task to be performed from the to-be-selected tasks.

Specifically, the control center 100 may first obtain a to-be-picked order, and determine item storage spaces of to-be-picked items included in the to-be-picked order. Since the determined item storage spaces are locations where the user and the handling device 104 need to cooperate in picking, each item storage space may be used as a dispatching destination of each independent picking task. The control center 100 needs to send a target task to dispatch the handling device 104 and the user to reach the item storage space for picking.

After determining each item storage space where an item is to be picked, the control center 100 may plan, for such an item storage space, a path for each user to reach the item storage space according to a start location of a respective terminal 102 carried by each user, and plan a path for each handling device 104 to reach the item storage space according to a start location of a respective handling device 104. Picking is the most time-consuming process in the conventional warehouse. The time-consuming movement between different item storage spaces is a factor that greatly impact on the picking efficiency. Therefore, in the present disclosure, the control center 100 may use an existing shortest path planning method to determine a path from each start location to each item storage space. Therefore, through a subsequent process, a to-be-selected task with the least time-consuming movement can be selected as a target task.

The control center 100 may determine, according to a stored assignment result of the to-be-picked orders, a to-be-picked order that has been assigned to a handling device. A manner for storing the assignment result of the to-be-picked orders is described later in the present disclosure. Moreover, not all to-be-picked orders have been assigned to the handling devices. When a to-be-picked item included in a to-be-picked order has not been picked, or has not been sent to a handling device as a picking object of a target task, the to-be-picked order is an order that has not been assigned to any handling device. After determining the assignment result of the to-be-picked orders, the control center 100 may continue to match, for the item storage space, according to each planned path for reaching the item storage space and the to-be-picked order assigned to each handling device, a user and a handling device for picking from the item storage space, and thus determine a plurality of to-be-selected tasks. Since the control center 100 is used to dispatch a handling device 104 and a user to the same item storage space for picking, the process of matching the user and the handling device for picking at the item storage space to determine a plurality of to-be-selected tasks may be considered as a process of combining a path corresponding to the determined handling device and a path corresponding to the determined user. A determined to-be-selected task includes information indicating which handling device 104 reaches which item storage space according to which path, and which terminal 102 carried by a user reaches the item storage space according to which path.

For each to-be-selected task, the control center 100 may determine a moment at which a user and a handling device 104 involved in the to-be-selected task cooperate to pick from the item storage space.

Specifically, the control center 100 may first determine, according to paths corresponding to a user and a handling device 104 involved in the to-be-selected task, a travel time of the user reaching the item storage space along the corresponding path and a travel time of the handling device 104 reaching the item storage space along the corresponding path. The user travel time may be determined according to a preset average moving speed of the user and a length of the path corresponding to the user. Similarly, the travel time of the handling device 104 may also be determined according to the same method. A user arrival moment is then determined according to the user travel time and a moment at which the user departs from the start location of the terminal, and a arrival moment of the handling device 104 is determined according to the travel time of the handling device 104 and a moment at which the handling device 104 departs from the start location. According to the user arrival moment and the arrival moment of the handling device 104, a moment at which the user and the handling device 104 cooperate to pick from the item storage space is determined. Since the departure moment of the user may be different from the departure moment of the handling device 104, and the travel times thereof may also be different, it is common that one of the handling device 104 and the user reaches the item storage space first, and the other reaches the item storage space later, and picking can only be performed when both parties reach the item storage space. Therefore, the control center 100 may determine, according to a later moment of the user arrival moment and the arrival moment of the handling device 104, a moment at which the user and the handling device 104 cooperate to pick from the item storage space.

After determining the picking moment of each to-be-selected task, the control center 100 may determine a target task from the to-be-selected tasks according to a determined picking moment sequence of the to-be-selected tasks. Specifically, since the control center 100 determines all the to-be-selected tasks for the item storage space where the handling devices 104 and the users may cooperate to pick the item, an earlier picking moment of a to-be-selected task indicates less time consumed by the handling device 104 and the user in movement before picking and thus a higher picking efficiency. Therefore, the control center 100 determines the to-be-selected task with the earliest picking moment as the target task.

For example, assuming that a specific handling device 104 and a specific user are just in front of a specific item storage space, and there is a to-be-picked item located in the item storage space, picking the to-be-picked item from the item storage space by the handling device 104 and the user corresponds to the least to-be-selected task time consumption. This is because the user can perform picking immediately, and the control center 100 may determine such a to-be-selected task as the target task.

Accordingly, the control center 100 may send, according to the determined target task, the target task to a terminal 102 carried by a user that performs the target task and a handling device 104 that performs the target task. In addition, the control center 100 may further assign a to-be-picked order (which includes the to-be-picked item of the target task) to the handling device 104, and update the stored assignment result of the to-be-picked orders. It should be noted that, if the to-be-picked order has been determined to be assigned to the handling device 104 in the foregoing process, the assignment result of the to-be-picked orders may not be updated in this case.

The handling device 104 may travel to the item storage space where the to-be-picked item corresponding to the target task is located according to the received target task, and wait for the user to pick the item. The user may receive the target task sent by the control center 100 according to the terminal 102 carried by the user, determine through the terminal 102 which item storage space needs to be reached for picking, and move to the item to cooperate with the handling device 104 for picking.

In addition, in the dispatching system provided in the present disclosure, a user-operated control panel, such as a touchscreen, may be further disposed on the handling device 104. After the user picks the to-be-picked item from the item storage space onto the handling device 104, the user may further send information that the target task is completed to the control center 100 through the control panel, so that the control center 100 can determine that the handling device 104 and the user can proceed to the next task.

Specifically, the handling device 104 may determine, according to a monitored user operation, that the picking is completed and the current performed target task is completed, and send information that the target task is completed to the control center 100. The control center 100 may determine, according to the received information that the target task is completed, the to-be-picked item as picked, and update a list of remaining to-be-picked items.

Alternatively, the user may operate the terminal 102 carried to send the information that the target task is completed to the control center 100. The terminal 102 may determine, according to a monitored user operation, that the picking is completed and the current performed target task is completed, and send information that the target task is completed to the control center 100.

In a case where the target task cannot be completed due to an abnormal situation, the user may send information that execution of the target task fails to the control center 100 through the handling device 104 or the terminal 102 carried by the user. The control center 100 may first determine that the item to be picked for the target task cannot be picked temporarily, then re-determine, in response to determining that the abnormal situation is eliminated, the item as a to-be-picked item during re-determining a target task, and determine all to-be-selected tasks corresponding to the to-be-picked item.

Based on the system shown in FIG. 3, for each to-be-picked item included in the to-be-picked order, the control center may plan, according to the location of the item storage space of the to-be-picked item, the start location of each terminal carried by the respective user, and the start location of each handling device, paths for the users and the handling devices to reach the item storage space. According to the determined path planning and assigned to-be-picked orders, matching of the users and the handling devices is performed to determine the plurality of to-be-selected tasks, and the picking moment of each to-be-selected task is determined. According to the picking moment sequence of the to-be-selected tasks, the target task is determined from the to-be-selected tasks, and the target task is sent to the terminal carried by the user that performs the target task and the handling device that performs the target task, to allow the user and the handling device to cooperate in picking. According to the planned paths of the handling devices and the users, and the assigned to-be-picked orders, the plurality of to-be-selected tasks and picking moments thereof are determined, so that the to-be-picked item with the least time consumed can be found for picking from the to-be-picked items. In one aspect, the user does not need to track one to-be-picked order for picking, but can pick a to-be-picked item included in any to-be-picked order nearby according to the target task received by the terminal. In another aspect, the advantages of the handling devices are fully utilized, so that the handling device does not need to cooperate with the same user in picking all the time, but can reach the item storage space specified by the target task and cooperate with different users in picking in a manner of maximizing the efficiency, which reduces the restrictions on the handling device. Without reconstructing the conventional warehouse, the dispatching system can reduce the time consumed by the user in movement during picking, and improve the picking efficiency.

In addition, in the present disclosure, after sending the target task to the handling device 104 and the terminal 102, the control center 100 may perform the process of determining a target task (i.e., a next target task), that is, continue to determine a target task and send the target task to a handling device 104 and a terminal 102 performing the target task.

Moreover, for each target task that has been sent, the control center 100 may no longer send another target task to the handling device 104 and the terminal 102 performing the target task before receiving information that the target task is completed. In other words, for a handling device 104 and a terminal 102 that have a to-be-performed target task, the control center 100 may no longer perform path planning until the handling device 104 and the terminal 102 complete the target task. In other words, the control center 100 may divide the handling devices 104 and the terminals 102 into two categories, where one refers to those that currently have no to-be-performed target task, and the other refers to those that currently have to-be-performed target tasks. A to-be-selected task performed by a handling device 104 and a terminal 102 that currently have no to-be-performed target task is selected as a target task.

However, this may cause the control center 100 to have less choice in determining a target task. Therefore, the present disclosure further provides another dispatching system. The control center 100 does not limit the options for determining a target task according to whether a handling device 104 and a terminal 102 have a to-be-performed target task. That is, regardless of whether each handling device 104 and each terminal are performing picking or not, the handling device and the terminal are considered as being capable of performing the picking.

To realize the foregoing process, the control center 100 needs to predict/determine, for a handling device 104 and a terminal 102 that are performing a target task, locations thereof after performing the assigned target task as start locations for path planning, and further needs to predict/determine a moment when the assigned target task is completed, to determine a picking moment when a to-be-selected task is performed.

The following describes the determination of the start location and the determination of the picking moment respectively.

In the picking and dispatching system provided in the present disclosure, after the control center 100 sends the target task, the handling device 104 that receives the target task and the user carrying the terminal 102 that receives the target task need to move to perform the target task. In this case, the control center 100 needs to continue to perform the foregoing process of determining a (next) target task according to the remaining to-be-picked items, and sequentially send determined target tasks, so that the handling devices 104 and the users in the warehouse continue to cooperate in picking until all the to-be-picked items are picked. Generally, items are constantly put in and out of the warehouse. Therefore, in practice, the process of picking and dispatching is not stopped.

Duration of performing the target task is usually greater than duration for the control center 100 to determine the target task. Therefore, after a period of time, when the control center 100 re-determines each item storage space to be picked and re-determines a target task, there may be a case in which each terminal 102 and each handling device 104 are all performing target tasks that have been sent in history. Therefore, the control center 100 may determine start locations of each terminal 102 and each handling device 104 according to the target tasks that have been sent.

Specifically, after sending a target task, the control center 100 may use a location of an item storage space of the target task as a start location of a handling device 104 and a terminal 102 carried by a user that perform the target task, and store the location.

Further, for each terminal 102, when the control center 100 may send a plurality of target tasks to the terminal 102. In this case, for each time the control center 100 sends a target task to the terminal 102, the control center 100 may update a stored start location of the terminal 102 according to a recently sent target task. Similarly, for each handling device 104, the control center 100 may also update the stored start location in the same manner.

Still further, when the control center 100 receives the information that the target task is completed, the stored location of the item storage space of the target task as the start location may be deleted, and a (new) start location is determined according to a location of the terminal 102 and a location of the handling device 104 determined in real time.

For example, assuming that for a terminal x, after the control center 100 sends a target task 1, a location A of an item storage space of the target task 1 may be used as a start location of the terminal x (for a next target task) and stored. After a target task 2 is sent to the terminal x, the start location of the terminal x is updated to a location B according to a location of an item storage space of the target task 2 being the location B. When information that the target task 1 is completed is received, since the currently stored start location is the location of the item storage space of the target task 2, the stored start location is not deleted. The stored start location of terminal x is deleted until the information that the target task 2 is completed is received, and a current location of the terminal x is used as a new start location.

Specifically, when determining start locations of each terminal 102 and each handling device 104, the control center 100 obtains, for each terminal 102, a current location of the terminal 102 as a start location of the terminal 102 when the terminal 102 has no to-be-performed target task, and obtains a stored start location of the terminal 102 when the terminal 102 has a to-be-performed target task.

For each handling device 104, a current location of the handling device 104 is obtained as a start location of the handling device 104 when the handling device 104 has no to-be-performed target task, and a stored start location of the handling device 104 is obtained when the handling device 104 has a to-be-performed target task.

In addition, the picking and dispatching system in the present disclosure may further include: a positioning base station 106. There may be a plurality of positioning base stations 106 disposed, which may be set as required and is not limited in the present disclosure. The positioning base station 106 is configured to communicate with each terminal 102, determine a location of each terminal 102, and send the determined location of each terminal 102 to the control center 100. The specific positioning manner of the positioning base station 106 is not limited in the present disclosure. For example, an ultra-wide band (UWB) technology may be used for positioning.

In addition, in the present disclosure, for each to-be-picked order, to avoid picking to-be-picked items included in the to-be-picked order into different handling devices 104, for each to-be-picked order, once any to-be-picked item included in the to-be-picked order is sent to a handling device 104 as an item to be picked in a target task for the first time, the control center 100 determines that the to-be-picked order is assigned to the handling device 104, and stores a correspondence between an order identifier of the to-be-picked order and a device identifier of the handling devices 104.

Therefore, when determining the to-be-selected task, the control center 100 may further determine the to-be-picked order which includes the to-be-picked item (of the to-be-selected task) to be picked at the item storage space, that is, determine which to-be-picked order includes the to-be-picked item.

Figure 4A:
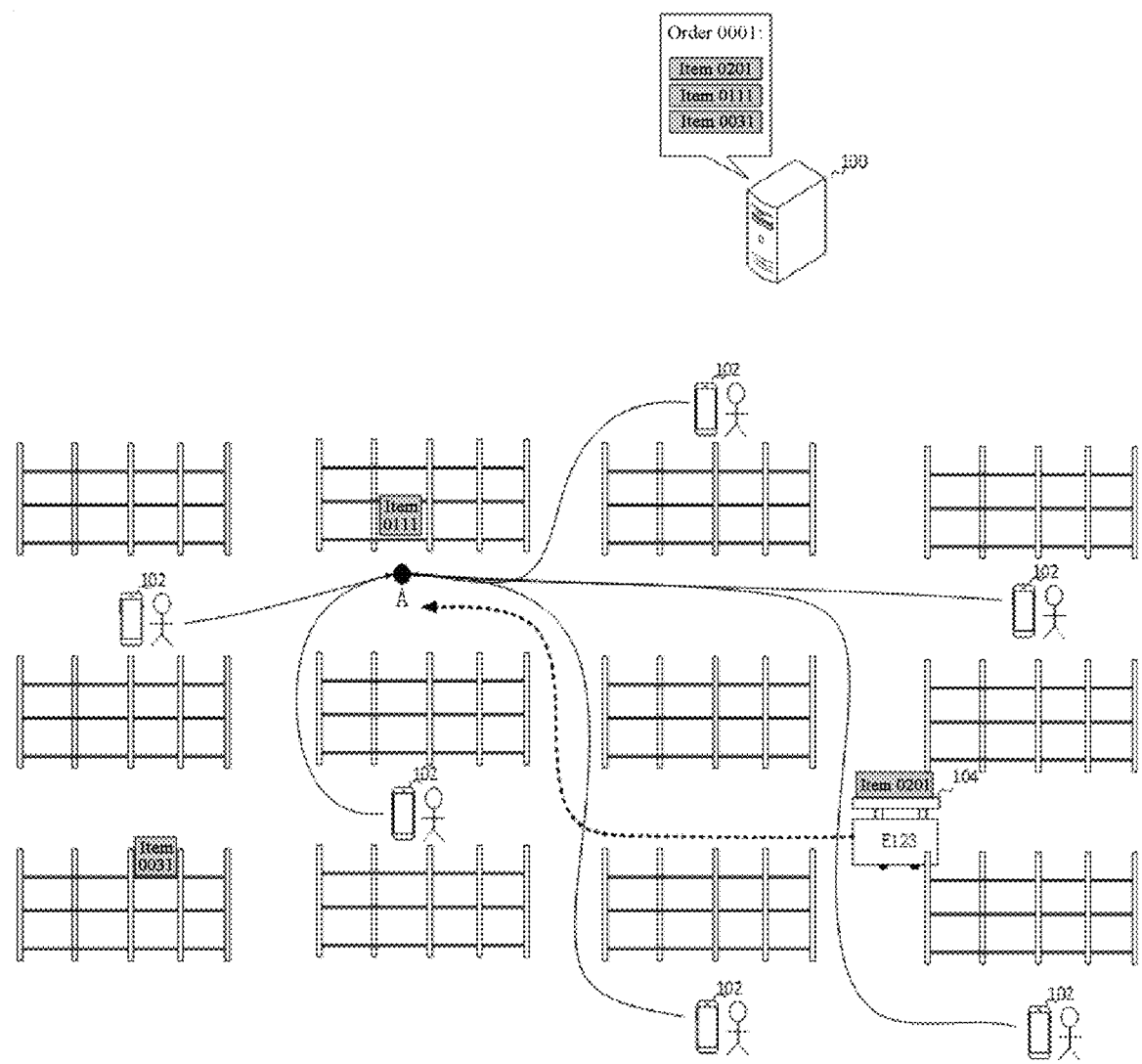
FIG. 4a is a schematic diagram of path planning according to an embodiment of the present disclosure.

When the to-be-picked order to which the to-be-picked item belongs has been assigned to a handling device 104, it means that the to-be-picked item can only be picked through the handling device 104, the control center 100 may then match a user and the handling device 104 for picking from the item storage space according to a path for the handling device 104 to reach the item storage space and a path for each user to reach the item storage space, and determine a plurality of to-be-selected tasks, as shown in FIG. 4a.

In FIG. 4a, it can be seen that to-be-picked items included in a to-be-picked order 0001 correspond to item identifiers of item 0201, item 0111, and item 0031, respectively. A handling device 104 having a device identifier of E123 is assigned with the to-be-picked order 0001, and holds the item whose item identifier is item 0201. For an item storage space (that is, location A in FIG. 4a) corresponding to the to-be-picked item with item identifier 0111, the control center 100 can only plan, for the handling device 104 having item identifier E123, a path to the location A, that is, a dotted line in FIG. 4a. Paths (solid lines in FIG. 4a) for users to reach the location A are planned, and a plurality of to-be-selected tasks are determined through matching.

When the to-be-picked order to which the to-be-picked item belongs has not been assigned to any handling device 104, it means that any handling device 104 can reach the item storage space and perform the picking task. Therefore, the control center 100 may match all users and all handling devices to pick from the item storage space according to all planned paths, and determine a plurality of to-be-selected tasks, as shown in FIG. 4b.

Figure 4B:
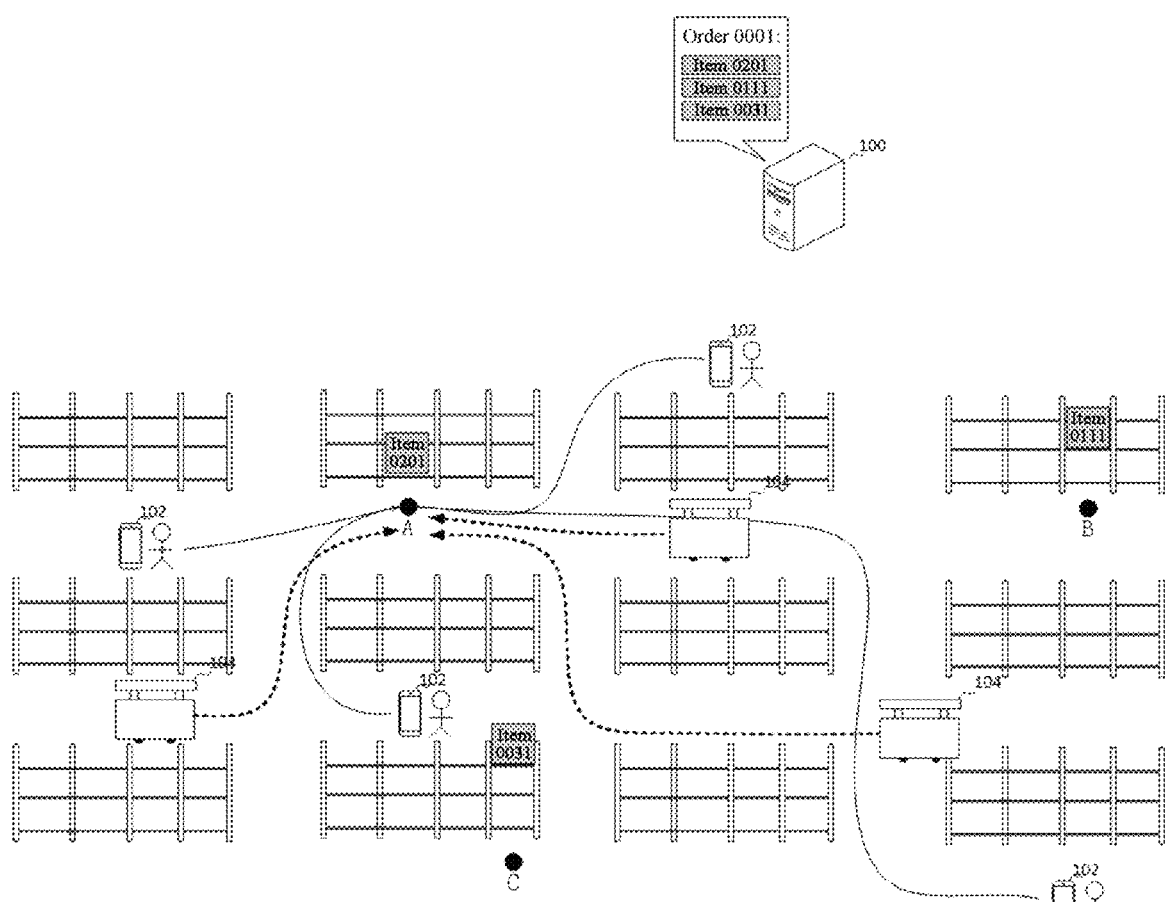
FIG. 4b is a schematic diagram of path planning according to an embodiment of the present disclosure.

In FIG. 4b, it can be seen that to-be-picked items included in the to-be-picked order 0001 correspond to item identifiers of item 0201, item 0111, and item 0031, respectively, and located at item storage spaces of location A, location B, and location C, respectively. Taking the item storage space corresponding to the to-be-picked item with the item identifier (item 0201) as an example, the control center 100 may plan paths for all handling devices 104 to reach the location A, that is, dotted lines in FIG. 4b, and plan paths for all users to reach the location A, that is, solid lines in FIG. 4b, and determine a plurality of to-be-selected tasks through matching.

Further, for each item storage space, the control center 100 may match, when matching a user and a handling device for picking from the item storage space and determining a plurality of to-be-selected tasks, possible handling devices 104 with possible users for picking from the item storage space as the to-be-selected tasks according to each of the planned paths.

Figure 5:
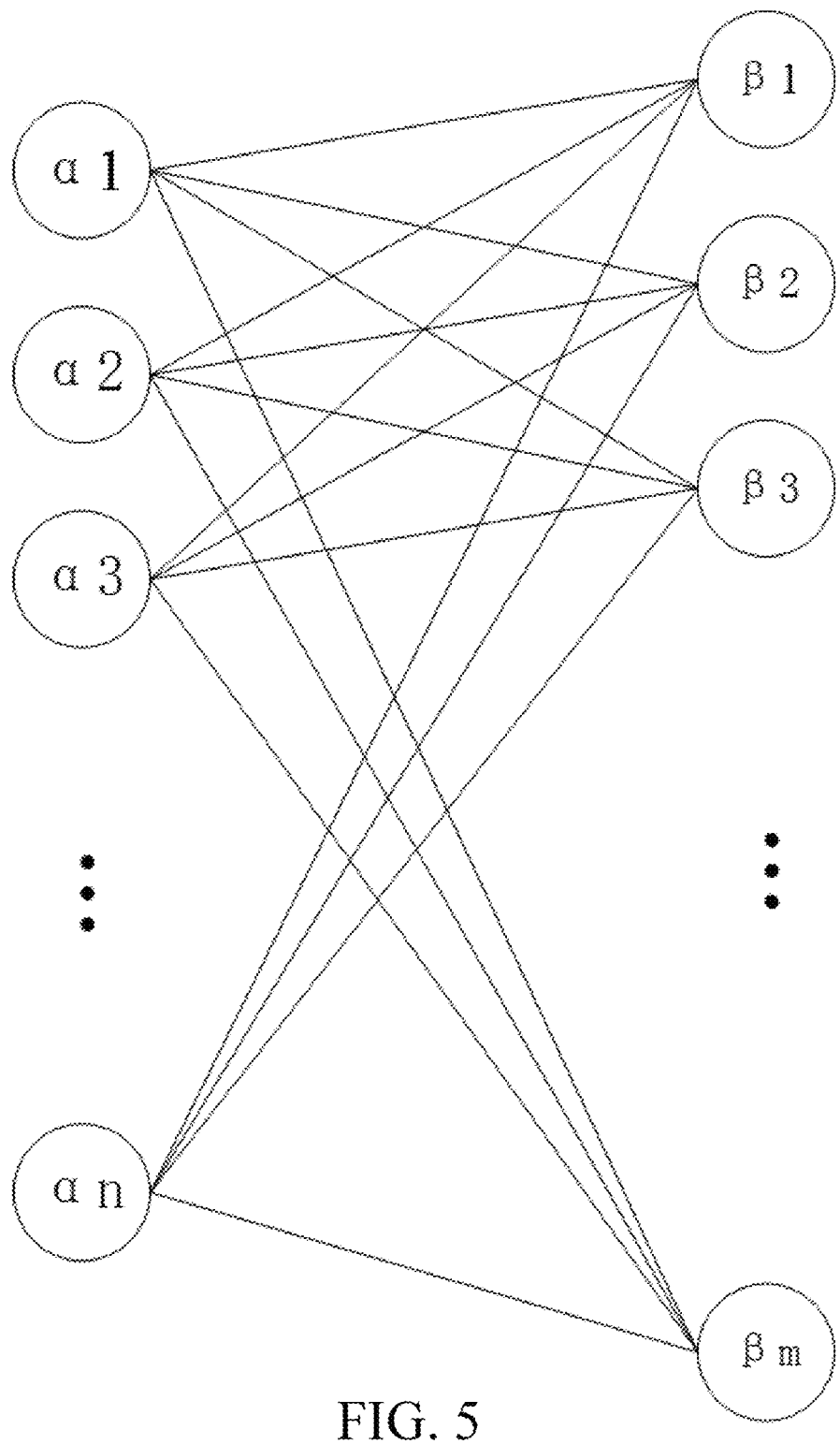
FIG. 5 is a schematic diagram of determining to-be-selected tasks with planned paths according to an embodiment of the present disclosure.

For example, it is assumed that paths corresponding to the handling devices 104 planned by the control center 100 for the item storage space at the location A are α1 to αn, respectively, and planned paths corresponding to the users are β1 to βm, respectively, where n indicates that there are a total of n handling devices 104 that can perform picking, and m indicates that there are a total of m users who can perform picking. In this case, according to the arrangement and combination as shown in FIG. 5, a plurality of to-be-selected tasks can be determined. In FIG. 5, nodes on the left represent the paths corresponding to the handling devices 104, nodes on the right represent the paths corresponding to the users, and each connecting line between the nodes represents a to-be-selected task determined through matching.

In the present disclosure, when the control center 100 needs to determine a picking moment of a to-be-selected task, the control center 100 uses, for each terminal 102, a current moment as a moment at which a user departs from a start location of the terminal 102 when the terminal 102 has no to-be-performed target task, and determines, when the terminal 102 has a to-be-performed target task, a moment at which the to-be-performed target task of the terminal 102 is completed as the moment at which the user departs from the start location of the terminal 102.

A moment at which the to-be-performed target task is completed is a moment at which all target tasks assigned to the terminal 102 are completed. Specifically, the moment at which all the target tasks are completed may be determined according to the moments of picking the assigned target tasks and a preset average picking time.

For example, it is assumed that target tasks sent to the terminal x are shown in Table 1.

TABLE 1

| Target task | Picking moment |
| --- | --- |
| Req1 | 19:00 |
| Req2 | 19:05 |
| Req3 | 19:08 |

Assuming that an average picking time is 1 minute, a moment at which all the target tasks for the terminal 102 are completed is 19:09.

Similarly, for each handling device 104, a current moment is used as a moment at which the handling device 104 departs from a start location when the handling device 104 has no to-be-performed target task, and when the handling device 104 has a to-be-performed target task, a moment at which the to-be-performed target task of the handling device 104 is completed is determined as the moment at which the handling device 104 departs from the start location for the next target task.

In addition, in the present disclosure the space for the handling device 104 to store items is limited. Therefore, to avoid dispatching a handling device 104 that has no extra space, the control center 100 may determine, for each handling device, remaining storage space of the handling device 104 according to a to-be-picked order assigned to the handling device 104; and skip assigning, when the remaining storage space of the handling device 104 is less than storage space required by an unassigned to-be-picked order, a target task corresponding to the unassigned to-be-picked order to the handling device 104.

It can be understood that, for each to-be-picked order, if the remaining storage space of the handling device 104 meets the storage space required by the to-be-picked order, the determination of path planning is performed for the handling device 104 in which the path planning is performed for item storage spaces of to-be-picked items included in the to-be-picked order.

For example, it is assumed that there are to-be-picked orders 01 to 03, as shown in Table 2.

TABLE 2

| To-be-picked order | Required storage space | Corresponding item storage space |
| --- | --- | --- |
| 01 | 0.1 m³ | A |
| 02 | 1 m³ | B |
| 03 | 0.5 m³ | C |

Assuming that remaining storage space of a handling device 104 is 0.6 m³, the control center 100 may plan paths for the handling device 104 to reach the item storage space A and the item storage space C from a start location without planning a path to the item storage space B.

Further, in the picking and dispatching system provided in the present disclosure, for each to-be-picked order that is not assigned to a handling device 104, before determining the assignment result of the to-be-picked order by sending target tasks, the control center 100 may pre-determine, according to current locations of the handling devices 104 and locations of item storage spaces of to-be-picked items included in the to-be-picked order, a handling device 104 to which the to-be-picked order is temporarily assigned.

However, it should be noted that, in this case, the handling device 104 to which the to-be-picked order is temporarily assigned is only a tentative state, which does not mean that the handling device 104 necessarily performs tasks corresponding to the to-be-picked order. The determination of to-be-selected tasks corresponding to the to-be-picked items included in the to-be-picked order may take into account the possibilities of performing the to-be-selected tasks by other handling devices 104.

If the current operation pressure of the control center 100 is high, and occupation of a computing resource of the control center 100 in the dispatching process is expected to be reduced, the control center 100 may determine to-be-selected tasks according to pre-determined assignment relationship of the handling device 104 to which the to-be-picked order is temporarily assigned.

Further, the process of determining the handling device 104 to which the to-be-picked order is temporarily assigned may be further performed in any of the following manners:

The control center 100 determines a central location corresponding to the item storage spaces according to the locations of the item storage spaces of the to-be-picked items included in the to-be-picked order, determines a nearest handling device 104 according to distances between the current locations of the handling devices 104 and the central location, and temporarily assigns the to-be-picked order to the determined handling device 104.

Alternatively, the control center 100 performs path planning according to the locations of the item storage spaces of the to-be-picked items included in the to-be-picked order, determines a location with the same distances to each of the item storage spaces in the warehouse, determines a nearest handling device 104 according to distances between the current locations of the handling devices 104 and the location, and temporarily assigns the to-be-picked order to the determined handling device 104.

Alternatively, the control center 100 performs path planning according to the locations of the item storage spaces of the to-be-picked items included in the to-be-picked order, determines a location in the warehouse with a smallest total path length to the item storage spaces according to a total path length of the path planning, determines a nearest handling device 104 according to distances between the current locations of the handling devices 104 and the location, and temporarily assigns the to-be-picked order to the determined handling device 104.

Figure 6:
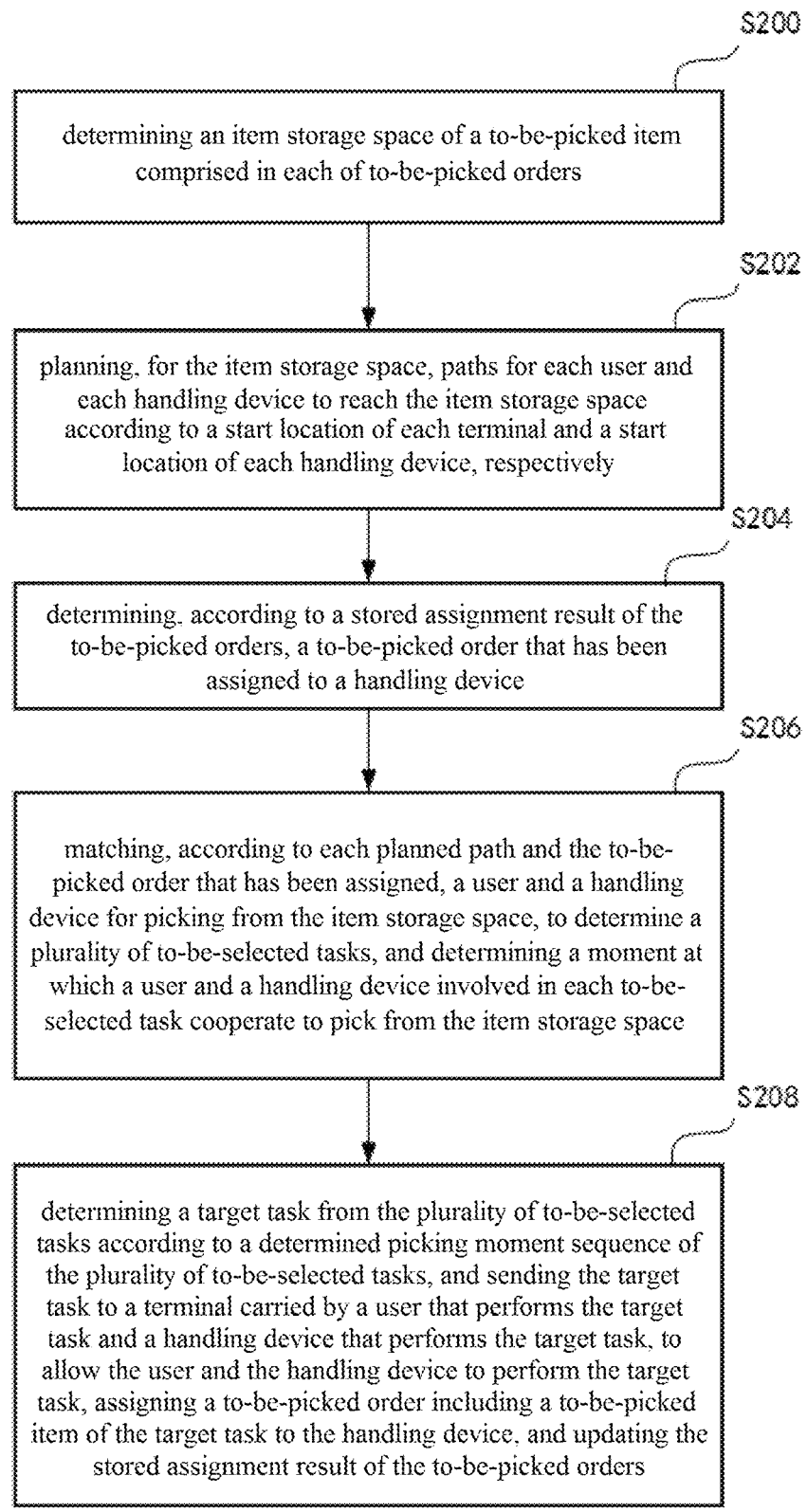
FIG. 6 is a flow chart of a picking and dispatching process according to an embodiment of the present disclosure.

Based on the system shown in FIG. 3, the present disclosure further provides a picking and dispatching method, as shown in FIG. 6.

FIG. 6 is a flow chart of a picking and dispatching method according to the present disclosure. A warehouse includes a control center, shelves, handling devices, and users. The picking and dispatching method may include the following operations.

In block S200, an item storage space of a to-be-picked item included in each of to-be-picked orders is determined.

In the present disclosure, the control center may determine the to-be-picked orders, determine item storage spaces of to-be-picked items included in the to-be-picked orders, and determine start locations of handling devices and users that can perform picking tasks.

In block S202, for the item storage space, paths for each user and each handling device to reach the item storage space are planed according to a start location of each terminal and a start location of each handling device, respectively.

In the present disclosure, for each item storage space, after the start locations of the handling devices and the users that can perform picking tasks are determined, paths for the users and the handling devices to reach the item storage space can be planned and determined, so that possible solutions for picking at the item storage space can be determined according to the planned paths, that is, the possible combinations of the users and the handling devices picking the to-be-picked item at the item storage space.

In block S204, according to a stored assignment result of the to-be-picked orders, a to-be-picked order that has been assigned to a handling device is determined.

In block S206, according to each planned path and the to-be-picked order that has been assigned, a user and a handling device are matched for picking from the item storage space, to determine a plurality of to-be-selected tasks, and a moment at which a user and a handling device included in each to-be-selected task cooperate to pick from the item storage space is determined.

In the present disclosure, since to-be-picked items included in the same to-be-picked order need to be picked onto the same handling device to facilitate the operation of subsequent processes (for example, packing and transporting out of the warehouse), the control center may match, according to each planned path and the to-be-picked order that has been assigned, the user(s) with the handling device (s) for picking from the item storage space to determine the plurality of to-be-selected tasks. In addition, for the assigned to-be-picked order, since only the same handling device can hold the remaining to-be-picked items included in the to-be-picked order, the to-be-picked order assigned to the handling device needs to be determined according to the stored assignment result of the to-be-picked orders.

In addition, for each to-be-selected task, the control center may further determine, according to a time required for the user to reach an item storage space from the start location and a departure moment of the user, a moment at which the user reaches the item storage space, and determine, according to a time required for the handling device to reach the item storage space from the start location and a departure moment of the handling device, a moment at which the handling device reaches the item storage space. According to the moment at which the user reaches the item storage space and the moment at which the handling device reaches the item storage space, a moment at which the user and the handling device involved in such a to-be-selected task cooperate to pick from the item storage space is determined.

In this way, a task with a higher picking efficiency can be determined as a target task to be assigned from a large number of determined to-be-selected tasks.

In block S208, a target task is determined from the plurality of to-be-selected tasks according to a determined picking moment sequence of the plurality of to-be-selected tasks, and the target task is sent to a terminal carried by a user that performs the target task and a handling device that performs the target task, to allow the user and the handling device to perform the target task, a to-be-picked order including a to-be-picked item of the target task is assigned to the handling device, and the stored assignment result of the to-be-picked orders is updated.

In the present disclosure, after determining the picking moment of each to-be-selected task, the control center may determine the target task from the to-be-selected tasks according to the determined picking moment sequence of the to-be-selected tasks. Specifically, since the control center determines all the to-be-selected tasks corresponding to the item storage spaces from which the handling devices cooperate with the users to pick items, an earlier picking moment of a to-be-selected task indicates less time consumed by the handling device and the user in movement before picking and thus a higher picking efficiency. Therefore, the control center determines the to-be-selected task with the earliest picking moment as the target task.

The control center may send, according to the determined target task, the target task to a terminal carried by the user that performs the target task and the handling device that performs the target task, which are involved in the target task. The handling device may travel to the item storage space where the to-be-picked item corresponding to the target task is located according to the received target task, and wait for the user to pick the item. The user may receive the target task sent by the control center according to the terminal carried by the user, determine through the terminal which item storage space needs to be reached for picking, and move to the item to cooperate with the handling device for picking.

In addition, in the dispatching system provided in the present disclosure, a user-operated control panel, such as a touchscreen, may be further disposed on the handling device. After the user picks the to-be-picked item from the item storage space onto the handling device, the user may further send information that the target task is completed to the control center through the control panel, so that the control center can determine that the handling device and the user can proceed to the next task.

Specifically, the handling device may determine, according to a monitored user operation, that the picking is completed and the current performed target task is completed, and send information that the target task is completed to the control center. The control center may determine, according to the received information that the target task is completed, the to-be-picked item that is picked, and update the to-be-picked items.

Alternatively, the user may alternatively operate the terminal carried to send the information that the target task is completed to the control center. The terminal may then determine, according to a monitored user operation, that the picking is completed and the current performed target task is completed, and send information that the target task is completed to the control center.

If the target task cannot be completed due to an abnormal situation, the user may alternatively send information that execution of the target task fails to the control center through the handling device or the terminal carried by the user. The control center may first determine that the item to be picked for the target task cannot be picked temporarily, then re-determine, in response to determining that the abnormal situation is eliminated, the item as a to-be-picked item during re-determining a target task, and determine all to-be-selected tasks corresponding to the to-be-picked item.

In some embodiments, the matching, according to each planned path and the to-be-picked order that has been assigned, the user and the handling device for picking from the item storage space, to determine the plurality of to-be-selected tasks includes: determining, for an item storage space, a to-be-picked order including a to-be-picked item to be picked from the item storage space; matching, when the to-be-picked order is assigned to a handling device, a user and the handling device for picking from the item storage space according to a path for the handling device to reach the item storage space and a path for each user to reach the item storage space to determine the plurality of to-be-selected tasks; and matching, when the to-be-picked order is not assigned to any handling device, a user and a handling device for picking from the item storage space according to planned paths for each handing device and each terminal to determine the plurality of to-be-selected tasks.

In some embodiments, the method further includes: storing, after sending the target task to a terminal carried by a user that performs the target task and a handling device that performs the target task, start locations of the terminal and the handling device according to a location of the item storage space of the target task.

In some embodiments, before planning paths for each user and each handling device to reach the item storage space according to the start location of each terminal and the start location of each handling device, respectively, the method further includes: determining the start location of each terminal and the start location of each handling device.

In some embodiments, the determining the start location of each terminal and the start location of each handling device further includes: obtaining, for each terminal, a current location of the terminal as a start location of the terminal when the terminal has no to-be-performed target task, and obtaining a stored start location of the terminal when the terminal has a to-be-performed target task; and obtaining, for each handling device, a current location of the handling device as a start location of the handling device when the handling device has no to-be-performed target task, and obtaining a stored start location of the handling device when the handling device has a to-be-performed target task.

In some embodiments, the determining a moment at which a user and a handling device involved in each to-be-selected task cooperate to pick from the item storage space includes: determining, for each to-be-selected task, according to paths corresponding to a user and a handling device involved in the to-be-selected task, a user travel time and a handling device travel time; determining a user arrival moment according to the user travel time and a moment at which the user departs from the start location of the terminal; determining a handling device arrival moment according to the handling device travel time and a moment at which the handling device departs from the start location; and determining, according to the user arrival moment and the handling device arrival moment, a moment at which the user and the handling device cooperate to pick from the item storage space.

In some embodiments, determining a moment at which the user departs from the start location of the terminal includes: determining, for each terminal, a current moment as a moment at which a user departs from a start location of the terminal when the terminal has no to-be-performed target task, and determining, when the terminal has a to-be-performed target task, a moment at which the to-be-performed target task of the terminal is completed as the moment at which the user departs from the start location of the terminal.

In some embodiments, determining a moment at which the handling device departs from the start location includes: determining, for each handling device, a current moment as a moment at which the handling device departs from a start location when the handling device has no to-be-performed target task, and determining, when the handling device has a to-be-performed target task, a moment at which the to-be-performed target task of the handling device is completed as the moment at which the handling device departs from the start location.

In some embodiments, the method further includes: determining, for each handling device, remaining storage space of the handling device according to a to-be-picked order assigned to the handling device; and skipping assigning, when the remaining storage space of the handling device is less than storage space required by an unassigned to-be-picked order, a target task corresponding to the unassigned to-be-picked order to the handling device.

In some embodiments, the method further includes: receiving information that the target task is completed sent by the terminal or the handling device, and updating the to-be-picked items, where the information that the target task is completed is sent by the terminal or the handling device according to a monitored user operation.

For the detailed execution process of the method, reference may be made to the foregoing details of the picking and dispatching system, and the details are not described again in the present disclosure.

Based on the method shown in FIG. 6, for each to-be-picked item included in the to-be-picked order, the control center may plan, according to the location of the item storage space of the to-be-picked item, the start location of each terminal carried by the respective user, and the start location of each handling device, paths for the users and the handling devices to reach the item storage space. According to the determined path planning and assigned to-be-picked orders, matching of the users and the handling devices is performed to determine the plurality of to-be-selected tasks, and the picking moment of each to-be-selected task is determined. According to the picking moment sequence of the to-be-selected tasks, the target task is determined from the to-be-selected tasks, and the target task is sent to the terminal carried by the user that performs the target task and the handling device that performs the target task, to allow the user and the handling device to cooperate in picking. According to the planned paths of the handling devices and the users, and the assigned to-be-picked orders, the plurality of to-be-selected tasks and picking moments thereof are determined, so that the to-be-picked item with the least time consumed can be found for picking from the to-be-picked items. In one aspect, the user does not need to track one to-be-picked order for picking, but can pick a to-be-picked item included in any to-be-picked order nearby according to the target task received by the terminal. In another aspect, the advantages of the handling devices are fully utilized, so that the handling device does not need to cooperate with the same user in picking all the time, but can reach the item storage space specified by the target task and cooperate with different users in picking in a manner of maximizing the efficiency, which reduces the restrictions on the handling device. Without reconstructing the conventional warehouse, the dispatching system can reduce the time consumed by the user in movement during picking, and improve the picking efficiency.

Figure 7:
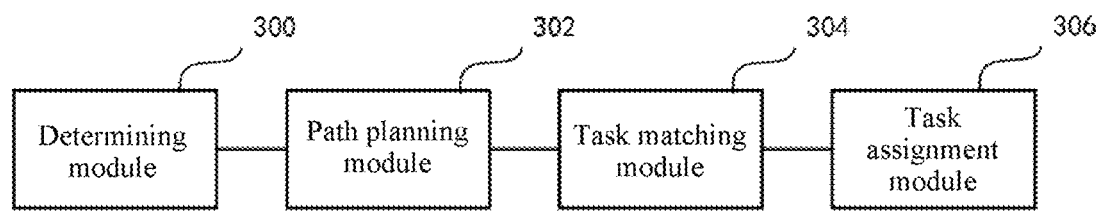
FIG. 7 is a schematic structural diagram of a picking and dispatching apparatus according to an embodiment of the present disclosure.

Based on the method shown in FIG. 6, the present disclosure further provides a picking and dispatching apparatus, as shown in FIG. 7.

FIG. 7 is a schematic structural diagram of a picking and dispatching apparatus according to the present disclosure. The apparatus may include:

a determining module 300, configured to determine an item storage space of a to-be-picked item included in an to-be-picked order;

a path planning module 302, configured to plan, for the item storage space to be picked, paths for each user and each handling device to reach the item storage space according to a start location of each terminal and a start location of each handling device, respectively;

a task matching module 304, configured to determine, according to a stored assignment result of the to-be-picked orders, a to-be-picked order that has been assigned to a handling device, match, according to each planned path and the to-be-picked order that has been assigned, a user and a handling device for picking from the item storage space, to determine a plurality of to-be-selected tasks, and determine a moment at which a user and a handling device involved in each to-be-selected task cooperate to pick from the item storage space; and a task assignment module 306, configured to match, according to each planned path and the to-be-picked order that has been assigned, a user and a handling device for picking from the item storage space, to determine the plurality of to-be-selected tasks, and determine a moment at which a user and a handling device involved in each to-be-selected task cooperate to pick from the item storage space; and assign a to-be-picked order including a to-be-picked item of the target task to the handling device, and update the stored assignment result of the to-be-picked orders.

In some embodiments, the task matching module 304 is configured to determine, for the item storage space, a to-be-picked order including a to-be-picked item to be picked from the item storage space; match, when the to-be-picked order is assigned to a handling device, a user and the handling device for picking from the item storage space according to a path for the handling device to reach the item storage space and a path for each user to reach the item storage space, to determine the plurality of to-be-selected tasks; and match, when the to-be-picked order is not assigned to any handling device, a user and a handling device for picking from the item storage space according to each planned path, to determine the plurality of to-be-selected tasks.

In some embodiments, after sending the target task to a terminal carried by a user that performs the target task and a handling device that performs the target task, the task assignment module 306 is configured to store start locations of the terminal and the handling device according to a location of the item storage space of the target task.

In some embodiments, before planning paths for each user and each handling device to reach the item storage space according to the start location of each terminal and the start location of each handling device, respectively, the path planning module 302 is configured to determine the start location of each terminal and the start location of each handling device.

In some embodiments, the path planning module 302 is configured to obtain, for each terminal, a current location of the terminal as a start location of the terminal when the terminal has no to-be-performed target task, and obtain a stored start location of the terminal when the terminal has a to-be-performed target task; and obtain, for each handling device, a current location of the handling device as a start location of the handling device when the handling device has no to-be-performed target task, and obtain a stored start location of the handling device when the handling device has a to-be-performed target task.

In some embodiments, the task matching module 304 is configured to determine, for each to-be-selected task according to paths corresponding to a user and a handling device involved in the to-be-selected task, a user travel time and a handling device travel time; determine a user arrival moment according to the user travel time and a moment at which the user departs from the start location of the terminal; determine a handling device arrival moment according to the handling device travel time and a moment at which the handling device departs from the start location; and determine, according to the user arrival moment and the handling device arrival moment, a moment at which the user and the handling device cooperate to pick from the item storage space.

In some embodiments, the task matching module 304 is configured to determine, for each terminal, a current moment as a moment at which a user departs from a start location of the terminal when the terminal has no to-be-performed target task, and determine, when the terminal has a to-be-performed target task, a moment at which the to-be-performed target task of the terminal is completed as the moment at which the user departs from the start location of the terminal.

In some embodiments, the task matching module 304 is configured to determine, for each handling device, a current moment as a moment at which the handling device departs from a start location when the handling device has no to-be-performed target task, and determine, when the handling device has a to-be-performed target task, a moment at which the to-be-performed target task of the handling device is completed as the moment at which the handling device departs from the start location.

In some embodiments, the task assignment module 306 is configured to determine, for each handling device, remaining storage space of the handling device according to a to-be-picked order assigned to the handling device; and skip assigning, when the remaining storage space of the handling device is less than storage space required by an unassigned to-be-picked order, a target task corresponding to the unassigned to-be-picked order to the handling device.

In some embodiments, the task assignment module 306 is configured to receive information that the target task is completed sent by the terminal or the handling device, and update the to-be-picked items, where the information that the target task is completed is sent by the terminal or the handling device according to a monitored user operation.

In the present disclosure, a non-transitory computer-readable storage medium is provided. The non-transitory computer-readable storage medium has stored therein executable instructions that, when loaded and executed by a processor, causes the processor to implement the picking and dispatching method as described in any of the above embodiments.

In addition to a software implementation, the present disclosure does not exclude other implementations, for example, a logic device or a combination of software and hardware. In other words, an entity executing the following processing procedure is not limited to the logic units, and may also be hardware or logic devices.

In the 1990s, improvements of a technology can be clearly distinguished as hardware improvements (for example, improvements to a circuit structure such as a diode, a transistor, or a switch) or software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of the present disclosure, the functions of the units may be implemented in the same piece of or a plurality of pieces of software and/or hardware.

A person skilled in the art should understand that the embodiments of the present disclosure may be provided as a method, a system, a non-transitory computer-readable storage medium, or a computer program product. The computer program product includes computer programs that, when executed by a processor, cause the processor to implement the method as described in any of the above embodiments.

Therefore, the present disclosure may be in the form of complete hardware embodiments, complete software embodiments, or embodiments combining software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in the present disclosure, the computer-readable medium does not include transitory computer-readable media (transitory media), such as a modulated data signal and a carrier.

It should be further noted that, the terms "include", "include", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the commodity, or the device that includes the element.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure can be described in the general context of computer-executable instructions executed by a computer, for example, program modules. Generally, the program module includes a routine, a program, an object, a component, a data structure, and the like for executing a particular task or implementing a particular abstract data type. The present disclosure may also be implemented in a distributed computing environment in which tasks are performed by remote processing devices connected by using a communication network. In a distributed computing environment, the program module may be located in both local and remote computer storage media including storage devices.

The embodiments of the present disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the present disclosure, and are not intended to limit the present disclosure. For a person skilled in the art, various modifications and changes may be made to the present disclosure. Any modification, equivalent replacement, improvement, or the like made within the spirit and principle of the present disclosure shall fall within the scope of the claims of the present disclosure.

What is claimed is:

1. A picking and dispatching system, comprising: a control center, a plurality of terminals each carried by a user, and a plurality of handling devices, wherein:
   the control center is configured to determine an item storage space of a to-be-picked item comprised in each of to-be-picked orders, and plan, for the item storage space, paths for each user and each handling device to reach the item storage space according to a start location of each terminal and a start location of each handling device, respectively;
   the control center is configured to determine, according to a stored assignment result of the to-be-picked orders, a to-be-picked order that has been assigned to a handling device;
   the control center is configured to match, according to each planned path and the to-be-picked order that has been assigned, a user and a handling device for picking from the item storage space, to determine a plurality of to-be-selected tasks, and determine a moment at which a user and a handling device involved in each to-be-selected task cooperate to pick from the item storage space;
   the control center is configured to determine a target task from the plurality of to-be-selected tasks according to a determined picking moment sequence of the plurality of to-be-selected tasks, and send the target task to a terminal carried by a user that performs the target task and a handling device that performs the target task;
   the control center is configured to assign, according to the target task sent to the handling device, a to-be-picked order including a to-be-picked item of the target task to the handling device, and update the stored assignment result of the to-be-picked orders;
   each terminal is configured to monitor its own location, send the location to the control center, receive the target task sent by the control center, and prompt the user to perform the target task; and each handling device is configured to monitor its own location, send the location to the control center, and travel to an item storage space for picking according to the received target task.

2. The system according to claim 1, wherein the control center is configured to:
   determine, for an item storage space, a to-be-picked order including a to-be-picked item to be picked from the item storage space;
   match, when the to-be-picked order is assigned to a handling device, a user and the handling device for picking from the item storage space according to a path for the handling device to reach the item storage space and a path for each user to reach the item storage space to determine the plurality of to-be-selected tasks; and
   match, when the to-be-picked order is not assigned to any handling device, a user and a handling device for picking from the item storage space according to planned paths for each handing device and each terminal to determine the plurality of to-be-selected tasks.

3. The system according to claim 1, wherein after sending the target task to a terminal carried by a user that performs the target task and a handling device that performs the target task, the control center is configured to store start locations of the terminal and the handling device according to a location of the item storage space of the target task.

4. The system according to claim 3, wherein the control center is configured to:
   obtain, for each terminal, a current location of the terminal as a start location of the terminal when the terminal has no to-be-performed target task, and obtain a stored start location of the terminal when the terminal has a to-be-performed target task; and
   obtain, for each handling device, a current location of the handling device as a start location of the handling device when the handling device has no to-be-performed target task, and obtain a stored start location of the handling device when the handling device has a to-be-performed target task.

5. The system according to claim 1, wherein the control center is configured to:
   determine, for each to-be-selected task, according to paths corresponding to a user and a handling device involved in the to-be-selected task, a user travel time and a handling device travel time;
   determine a user arrival moment according to the user travel time and a moment at which the user departs from the start location of the terminal;
   determine a handling device arrival moment according to the handling device travel time and a moment at which the handling device departs from the start location; and
   determine, according to the user arrival moment and the handling device arrival moment, a moment at which the user and the handling device cooperate to pick from the item storage space.

6. The system according to claim 5, wherein the control center is configured to:
   determine, for each terminal, a current moment as a moment at which a user departs from a start location of the terminal when the terminal has no to-be-performed target task, and determine, when the terminal has a to-be-performed target task, a moment at which the to-be-performed target task of the terminal is completed as the moment at which the user departs from the start location of the terminal; and
   determine, for each handling device, a current moment as a moment at which the handling device departs from a start location when the handling device has no to-be-performed target task, and determine, when the handling device has a to-be-performed target task, a moment at which the to-be-performed target task of the handling device is completed as the moment at which the handling device departs from the start location.

7. The system according to claim 1, wherein the control center is configured to determine, for each handling device, remaining storage space of the handling device according to a to-be-picked order assigned to the handling device; and skip assigning, when the remaining storage space of the handling device is less than storage space required by an unassigned to-be-picked order, a target task corresponding to the unassigned to-be-picked order to the handling device.

8. The system according to claim 1, wherein when reaching the item storage space, the terminal or the handling device determines that the picking is completed according to a monitored user operation, and sends information that the target task is completed to the control center; and
   the control center is configured to update the to-be-picked items according to the received information that the target task is completed.

9. The system according to claim 1, further comprising: a positioning base station, wherein the positioning base station is configured to communicate with each terminal, determine a location of each terminal, and send the determined location of each terminal to the control center.

10. The system according to claim 1, wherein each handling device is configured to determine its own location according to acquired environment information, and send the location to the control center.

11. A picking and dispatching method, comprising:
    determining an item storage space of a to-be-picked item comprised in each of to-be-picked orders;
    planning, for the item storage space, paths for each user and each handling device to reach the item storage space according to a start location of each terminal and a start location of each handling device, respectively;
    determining, according to a stored assignment result of the to-be-picked orders, a to-be-picked order that has been assigned to a handling device;
    matching, according to each planned path and the to-be-picked order that has been assigned, a user and a handling device for picking from the item storage space, to determine a plurality of to-be-selected tasks, and determining a moment at which a user and a handling device involved in each to-be-selected task cooperate to pick from the item storage space; and
    determining a target task from the plurality of to-be-selected tasks according to a determined picking moment sequence of the plurality of to-be-selected tasks, and sending the target task to a terminal carried by a user that performs the target task and a handling device that performs the target task, to allow the user and the handling device to perform the target task, assigning a to-be-picked order including a to-be-picked item of the target task to the handling device, and updating the stored assignment result of the to-be-picked orders.

12. The method according to claim 11, wherein the matching, according to each planned path and the to-be-picked order that has been assigned, the user and the handling device for picking from the item storage space, to determine the plurality of to-be-selected tasks comprises:

determining, for an item storage space, a to-be-picked order including a to-be-picked item to be picked from the item storage space;

matching, when the to-be-picked order is assigned to a handling device, a user and the handling device for picking from the item storage space according to a path for the handling device to reach the item storage space and a path for each user to reach the item storage space to determine the plurality of to-be-selected tasks; and matching, when the to-be-picked order is not assigned to any handling device, a user and a handling device for picking from the item storage space according to planned paths for each handing device and each terminal to determine the plurality of to-be-selected tasks.

13. The method according to claim 11, further comprising:

storing, after sending the target task to a terminal carried by a user that performs the target task and a handling device that performs the target task, start locations of the terminal and the handling device according to a location of the item storage space of the target task.

14. The method according to claim 13, wherein before planning paths for each user and each handling device to reach the item storage space according to the start location of each terminal and the start location of each handling device, respectively, the method further comprises:

determining the start location of each terminal and the start location of each handling device.

15. The method according to claim 14, wherein determining the start location of each terminal and the start location of each handling device comprises:

obtaining, for each terminal, a current location of the terminal as a start location of the terminal when the terminal has no to-be-performed target task, and obtaining a stored start location of the terminal when the terminal has a to-be-performed target task; and obtaining, for each handling device, a current location of the handling device as a start location of the handling device when the handling device has no to-be-performed target task, and obtaining a stored start location of the handling device when the handling device has a to-be-performed target task.

16. The method according to claim 11, wherein determining a moment at which a user and a handling device involved in each to-be-selected task cooperate to pick from the item storage space comprises:

determining, for each to-be-selected task, according to paths corresponding to a user and a handling device involved in the to-be-selected task, a user travel time and a handling device travel time;

determining a user arrival moment according to the user travel time and a moment at which the user departs from the start location of the terminal;

determining a handling device arrival moment according to the handling device travel time and a moment at which the handling device departs from the start location; and determining, according to the user arrival moment and the handling device arrival moment, a moment at which the user and the handling device cooperate to pick from the item storage space.

17. The method according to claim 16, wherein determining a moment at which the user departs from the start location of the terminal comprises:

determining, for each terminal, a current moment as a moment at which a user departs from a start location of the terminal when the terminal has no to-be-performed target task, and determining, when the terminal has a to-be-performed target task, a moment at which the to-be-performed target task of the terminal is completed as the moment at which the user departs from the start location of the terminal.

18. The method according to claim 16, wherein determining a moment at which the handling device departs from the start location comprises:

determining, for each handling device, a current moment as a moment at which the handling device departs from a start location when the handling device has no to-be-performed target task, and determining, when the handling device has a to-be-performed target task, a moment at which the to-be-performed target task of the handling device is completed as the moment at which the handling device departs from the start location.

19. The method according to claim 11, further comprising:

determining, for each handling device, remaining storage space of the handling device according to a to-be-picked order assigned to the handling device; and skipping assigning, when the remaining storage space of the handling device is less than storage space required by an unassigned to-be-picked order, a target task corresponding to the unassigned to-be-picked order to the handling device.

* * * * *